United States Patent [19]

Lee et al.

[11] 4,402,908
[45] Sep. 6, 1983

[54] METHOD FOR REDUCING HEAT LOSS FROM CONTAINED BODIES OF WATER USING POLYSILOXANE FOAMS

[75] Inventors: Chi-Long Lee; James A. Rabe, both of Midland, Mich.

[73] Assignee: Dow Corning Corporation, Midland, Mich.

[21] Appl. No.: 392,420

[22] Filed: Jun. 25, 1982

[51] Int. Cl.³ .............................................. B01J 19/16
[52] U.S. Cl. ..................................... 422/43; 252/382; 252/383; 252/384
[58] Field of Search ........................... 422/41, 42, 43; 252/382, 383, 384

[56] References Cited

U.S. PATENT DOCUMENTS

| 2,797,138 | 6/1957 | Veatch et al. | 422/42 |
| 2,797,139 | 6/1957 | Veatch et al. | 422/42 |
| 2,797,141 | 6/1957 | Veatch et al. | 422/42 |
| 2,907,627 | 10/1959 | Cummings | 422/42 |
| 3,024,210 | 3/1962 | Weyer | 260/2.5 |
| 3,458,469 | 7/1969 | Murphy | 260/37 |
| 3,507,611 | 4/1970 | Boultinghouse | 422/43 |
| 3,518,047 | 6/1970 | Alsgaard | 422/43 |
| 3,738,807 | 6/1973 | Horowitz et al. | 422/43 |
| 3,923,705 | 12/1975 | Smith | 260/2.5 S |
| 3,993,443 | 11/1976 | Guenthner | 422/43 |
| 4,026,835 | 7/1975 | Lee et al. | 260/2.5 S |
| 4,235,743 | 11/1980 | Canevari | 422/42 X |

FOREIGN PATENT DOCUMENTS 500807 4/1976 U.S.S.R. ............................ 422/42

Primary Examiner—Barry S. Richman
Attorney, Agent, or Firm—Robert Spector

[57] ABSTRACT

Heat loss and evaporation from contained bodies of water are reduced by generating a cured polysiloxane foam on the surface of the water. The foam is formed by reacting an organohydrogenpolysiloxane with the water in the presence of a rhodium catalyst or an inhibited or chelated platinum catalyst.

26 Claims, 1 Drawing Figure

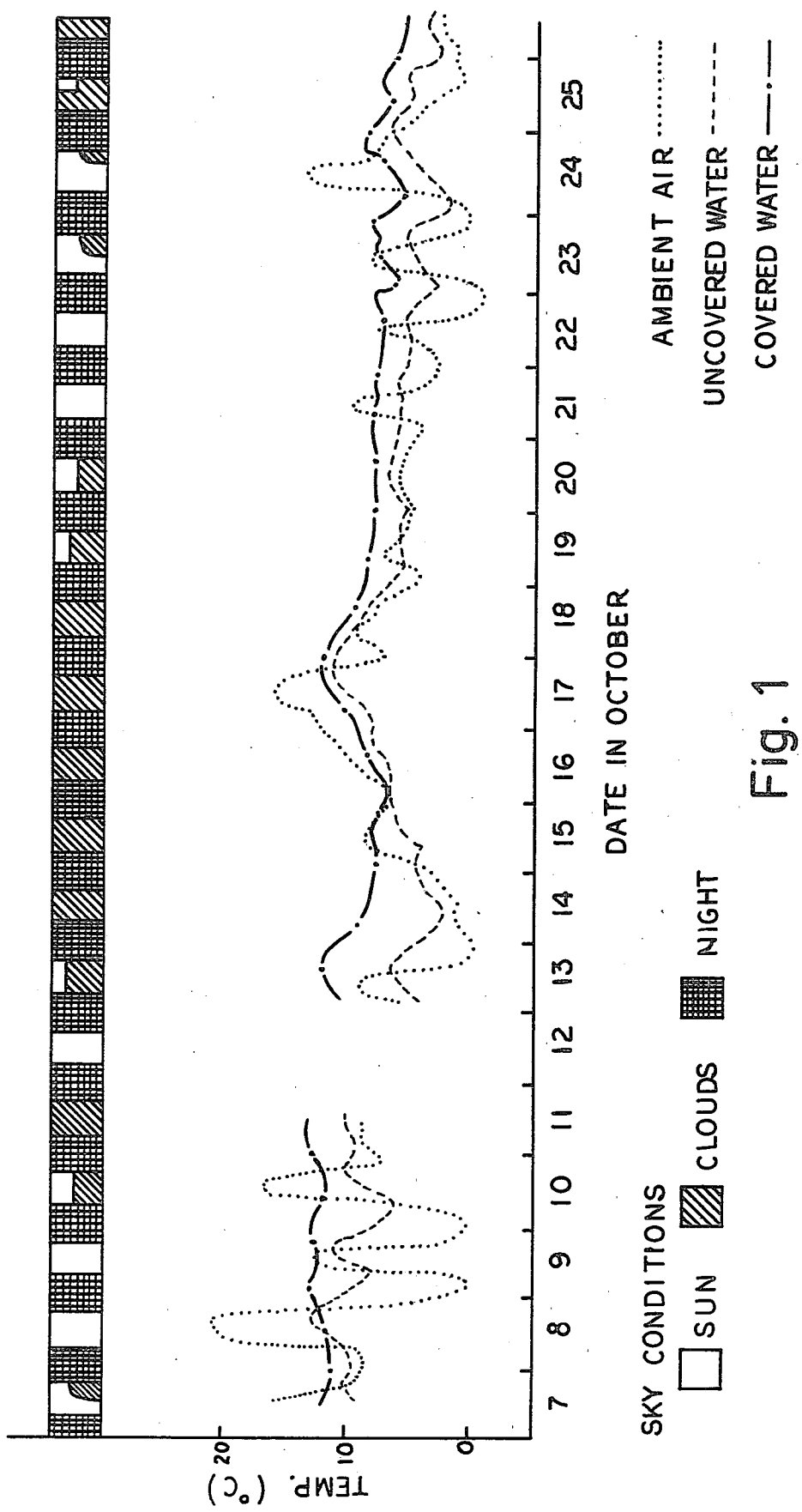

METHOD FOR REDUCING HEAT LOSS FROM CONTAINED BODIES OF WATER USING POLYSILOXANE FOAMS

BACKGROUND OF THE INVENTION

1. Field of the Invention

This invention relates to a method for insulating a body of water against heat loss. More particularly, this invention relates to a method for reducing evaporation and heat loss from a contained body of water by generating a layer of cured organopolysiloxane foam on the surface of the water.

2. Description of the Prior Art

There is an ongoing need for new sources of energy other than fossil fuels. One alternative source that has been the subject of much investigation is utilization of the heat energy imparted to contained bodies of water by the sun. This heat energy can be removed from the water by heat exchangers and subsequently converted to other forms, such as electricity, by the use of turbine-driven devices, including generators. While it is true that certain contained bodies of water, referred to in the art as solar ponds, absorb and retain solar energy as heat, this advantage is offset by the tendency of the water to radiate a substantial portion of this stored energy back into the atmosphere when the sun is not present. One method for reducing this heat loss is to employ what has become known as a salt gradient pond, in which a higher concentration of dissolved salt is established throughout the lower portion of the pond than at the surface. The higher salt content at the lower levels reduces or prevents thermal convection whereby the heated water at the bottom of the pond would tend to rise to the surface and lose its heat to the atmosphere through evaporation. While salt gradient ponds are initially relatively efficient, the salt gradually diffuses throughout the entire pond, thereby nullifying the ability of the pond to suppress convective heat loss. The salt gradient can be reestablished by injection of a concentrated salt solution at the bottom of the pond and addition of fresh water to the surface layer.

An alternate method for reducing convective and evaporative heat losses from solar ponds is to employ a fresh water pond having an insulating layer over the surface of the pond. In addition to reducing heat loss and evaporation, the layer should be sufficiently transparent or translucent to allow at least a portion of the incident sunlight to penetrate the layer and warm the surface of the pond. A variety of insulative materials, including floating glass beads, inflated multiple plastic films, liquid foams, blocks of previously prepared solid foam and removable covers have been proposed, however none of these has proven completely satisfactory.

Generating a solid, curable foam on the surface of the water would provide the desired insulation against heat loss as well as reduce evaporation. Organopolysiloxane foams would be particularly desirable because of their durability and chemical inertness, however the prior art does not teach a method for generating this type of foam in the presence of a large excess of water.

Organopolysiloxane foams are well known materials. U.S. Pat. No. 3,024,210, issued on Mar. 6, 1962 to Donald E. Weyer, discloses a method for forming organopolysiloxane resin foams at room temperature and states that these types of foams are useful as insulating materials for a variety of substrates. The foams are prepared by reacting an organopolysiloxane containing at least 1% by weight of SiH groups and a non-acidic hydroxylated compound, such as water, in the presence of a catalytic amount of a quaternary ammonium compound. The concentration of hydroxylated compound is preferably less than 50%, based on the weight of the organopolysiloxane.

The use of platinum compounds as catalysts for the reaction between compounds containing terminal silicon-bonded hydrogen atoms and hydroxyl-containing compounds is taught in U.S. Pat. No. 3,458,469, issued on July 29, 1969 to R. A. Murphy, which further discloses forming solid, "bubble-free, transparent" elastomers by reacting silicon-hydrogen terminated organopolysiloxanes with silanol terminated organopolysiloxanes at room temperature in the presence of a platinum catalyst and an organosilicon compound containing more than two silicon-bonded hydrogen atoms per molecule. Since the objective of this teaching is to prepare "bubble-free" products, using the hydrogen generated as a by-product of the reaction as a blowing agent to form a foam material would be directly contrary to the teaching of this reference.

U.S. Pat. No. 3,923,705, issued on Dec. 2, 1975 to S. B. Smith is directed toward a method for preparing fire retardant siloxane foams by the reaction of an organohydrogen siloxane, a hydroxylated organosiloxane and a platinum catalyst. This reference specifies that the molar ratio of silicon-bonded hydrogen atoms to silicon-bonded hydroxyl radicals is from 2.5 to 40. Below a ratio of 2.5, the foams "are too friable and weak to be useful in the known applications."

The use of rhodium compounds as catalysts for the preparation of organopolysiloxane foams by the reaction of an organohydrogensiloxane with a hydroxyl-containing organosiloxane is taught in U.S. Pat. No. 4,026,835 issued on May 31, 1977 to C. L. Lee et al. The reaction is conducted at temperatures of at least 90° C., which would not be applicable to preparing foams at the ambient temperature of a body of water.

None of the aforementioned references provides a practical method for forming a cured organopolysiloxane foam on the surface of a body of water using the water as one of the reactants. Applicants have found that this objective can be achieved by covering the surface of a contained body of water with a composition containing at least one member of a specified class of liquid organohydrogenpolysiloxanes having a concentration of silicon-bonded hydrogen atoms that is within a specified range, and an effective amount of a catalyst that will promote the reaction of the organohydrogenpolysiloxane with water at the desired rate under ambient conditions to yield a cured foam. Formation of a cured foam from an organohydrogenpolysiloxane in the presence of so large an excess of water is considered surprising in view of the teaching in the aforementioned patents.

SUMMARY OF THE INVENTION

Cured organopolysiloxane foams are prepared on the surface of contained bodies of water by depositing on said surface a substantially coherent layer of a liquid composition containing a specified class of organohydrogenpolysiloxanes and a catalytically effective amount of a catalyst for the reaction of silicon-bonded hydrogen atoms with water. The concentration of silicon-bonded hydrogen atoms in the liquid composition is above a minimum value that is dependent upon the viscosity of the liquid composition.

BRIEF DESCRIPTION OF THE DRAWINGS

FIG. 1 is a graphical representation of the variation in temperature as a function of time exhibited by (1) a body of water exposed to the ambient air, (2) a body of water covered by a polysiloxane foam prepared in accordance with the method of this invention, and (3) the ambient air. The two bodies of water were located adjacent to one another in an area exposed to the direct rays of the sun during the period from October 7 to October 25.

DETAILED DESCRIPTION OF THE INVENTION

This invention provides a method for reducing evaporation and heat loss from a contained body of water by (1) depositing on the surface thereof a substantially coherent layer containing an amount equal to at least 0.3 gram per square centimeter of water surface of a foamable and curable liquid composition comprising (a) a liquid organohydrogenpolysiloxane containing an average of at least 5 silicon-bonded hydrogen atoms per molecule and no more than one hydrogen atom bonded to any silicon atom, wherein the organic groups bonded to silicon are selected from the group consisting of alkyl containing from 1 to 6 carbon atoms, fluoroalkyl containing from 1 to 3 carbon atoms, cycloalkyl and phenyl, and (b) an amount of a catalyst sufficient to cause the reaction of said composition with water to proceed at a rate that will yield a cured foam at the ambient temperature of said body of water, and (2) thereafter allowing said composition to form a cured foam on the surface of said body of water, wherein the minimum concentration of silicon-bonded hydrogen atoms in said liquid composition is 0.7% based on the weight of said composition when the viscosity of said composition is 0.05 Pa·s or less, as measured at 25° C., and decreases from 0.7% to 0.35% as the viscosity of said composition increases from 0.05 to 5 Pa·s, and is 0.35% when the viscosity of said composition equals or exceeds 5 Pa·s with the proviso that when the viscosity of said composition is less than about 0.15 Pa·s, any polysiloxane component of said composition that constitutes more than 5% by weight of the composition and exhibits a viscosity lower than about 0.05 Pa·s contains at least three silicon-bonded species per molecule, said species being selected from the group consisting of hydrogen, hydroxyl and vinyl.

In accordance with the method of this invention a liquid composition containing an organohydrogenpolysiloxane is deposited as a substantially coherent layer on the surface of a contained body of water. As used in the specification, the term "substantially coherent" allows for some discontinuity in the layer of liquid polysiloxane. Discontinuities can result from wave action, wind or other phenomena not under the control of the person or persons carrying out the application of a foamable polysiloxane composition in accordance with the present method. To optimize the insulative properties of the final foam, the layer of polysiloxane composition should be coherent and continuous over the surface to be treated in order to produce a foam that is substantially free of discontinuities. Achieving this ideal situation becomes increasingly more difficult with progressively larger bodies of water, which are more susceptible to developing waves when exposed to even the most gentle air currents. The discontinuities present in foams generated in the presence of minimal wave action will usually not adversely affect to any substantial extent the ability of the final foam to reduce heat loss and evaporation from the body of water.

THE ORGANOHYDROGENPOLYSILOXANE

In order to form a cured foam with sufficient strength to retain its integrity on the surface of the water, the organohydrogenpolysiloxane component of a foamable and curable composition of this invention should contain an average of at least five silicon-bonded hydrogen atoms, preferably from 5 to 40 silicon-bonded hydrogen atoms, per molecule. No more than one hydrogen atom should be present on any silicon atom, and the composition as it is deposited on the water should contain a minimum of from 0.35 to 0.7% by weight of silicon-bonded hydrogen atoms. The limit of 0.7% applies to compositions having a viscosity of about 0.05 pascal seconds (Pa·s) or less at 25° C. As the viscosity of the composition increases from 0.05 up to about 5 Pa·s, the minimum concentration of silicon-bonded hydrogen atoms required to prepare a useful foam gradually decreases to a level of about 0.35% and remains at this level for higher viscosity compositions. While not wishing to be bound to any theory, it is believed that this variation in the minimum concentration of silicon-bonded hydrogen is related to the ability of the composition to entrap the bubbles of hydrogen gas generated during the early stages of the reaction of the silicon-bonded hydrogen atoms with water. The reaction time required to achieve a viscosity sufficient to entrap hydrogen gas, the agent which is responsible for foam formation, is often directly proportional to the initial viscosity of the composition. Since the amount of hydrogen gas that does not contribute to foam formation is relatively larger for low viscosity compositions, particularly those having viscosities below about 5 Pa·s, these compositions require higher initial concentrations of silicon-bonded hydrogen atoms.

In addition to the aforementioned hydrogen atoms, the silicon atoms in the repeating units of the organohydrogenpolysiloxane are also bonded to divalent oxygen atoms and one or two alkyl, fluoroalkyl, cycloalkyl or phenyl groups as specified heretofore. Representative groups include methyl, ethyl, propyl, isopropyl, the isomeric butyl, pentyl and hexyl groups, cyclohexyl, phenyl and 3,3,3-trifluoropropyl.

The optimum concentration range of silicon-bonded hydrogen atoms for a given foamable composition of this invention is determined by a number of parameters, including the concentration of any optional organopolysiloxanes having groups which react with silicon-bonded hydrogen atoms, the average molecular weight of all the organopolysiloxanes in the formulation, the concentration of catalyst and the properties such as thickness and cell size desired in the final foam. All other factors being equal, increasing the concentration of silicon-bonded hydrogen atoms generally increases the density of the bonds between adjacent polymer molecules that form during curing of the foam. The maximum concentration of silicon-bonded hydrogen atoms is 1.7%, based on the weight of the foamable composition. This value is equivalent to a cyclic or linear polysiloxane containing one hydrogen atom on every silicon atom. Foams prepared from compositions containing more than about 1% by weight of silicon-bonded hydrogen atoms are often brittle and relatively weak. This type of foam is useful for insulating relatively small bodies of water that are not exposed to substantial amounts of wind and other effects of weather. A desirable combination of durability and flexibility in the cured foam can be achieved by maintaining the concentration of silicon-bonded hydrogen atoms within the preferred range of from 0.35 to 0.7%, based on the weight of the foamable composition. The resultant foams will withstand the adverse effects of weathering for prolonged periods of time.

The organohydrogenpolysiloxane component of the foamable composition is a cyclic or acyclic homopolymer or an acyclic copolymer wherein a portion of the silicon atoms are not bonded to hydrogen atoms. If the organohydrogenpolysiloxane is acyclic, the terminal units of the polymer molecules contain a silicon-bonded hydrogen atom or a silicon-bonded alkyl, cycloalkyl, fluoroalkyl or phenyl group. Preferably the alkyl group is methyl and the fluoroalkyl group is 3,3,3-trifluoropropyl.

Organohydrogenpolysiloxane compositions containing less than the aforementioned maximum concentration (1.7% by weight) of silicon-bonded hydrogen atoms can be prepared by combining one or more cyclic or acyclic homopolymers having repeating units of the formula

with one or more cyclic or acyclic polydiorganosiloxanes having repeating units of the formula

and no silicon-bonded hydrogen atoms. In the foregoing formulae $R^1$ and each of the two $R^2$ groups are individually selected from the group consisting of alkyl containing from 1 to 6 carbon atoms, fluoroalkyl containing from 1 to 3 carbon atoms, cycloalkyl and phenyl. $R^1$ and $R^2$ preferably represent methyl, this preference being based on the availability of the corresponding monomers.

Particularly preferred mixtures of polysiloxanes include a trimethylsiloxy terminated liquid methylhydrogenpolysiloxane having a viscosity of from 0.02 to 0.04 pascal seconds (Pa·s) at 25° C. in combination with a dimethylvinylsiloxy- or dimethylhydroxysiloxy terminated polydimethylsiloxane having a viscosity of from 1 to about 50 Pa·s. The weight ratio of the two polymers will be determined by the desired concentration of silicon-bonded hydrogen atoms in the foamable composition.

In place of the aforementioned mixtures one can employ random or block copolymers wherein only a fraction of the repeating units contain silicon-bonded hydrogen atoms. Methods for preparing both the random and block types of siloxane copolymers are known in the art. A preferred type of copolymer consists essentially of repeating units of the formulae

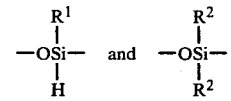

where $R^1$ and $R^2$ are as previously defined.

Representative copolymers include those containing trimethylsiloxy and methylhydrogensiloxane units; combinations of trimethylsiloxy, dimethylsiloxane and methylhydrogensiloxane units and combinations of dimethylhydrogensiloxy, dimethylsiloxane and methylhydrogensiloxane units.

A particularly preferred copolymer structure is one wherein units of the formula

are separated by a chain of 100 or more dimethylsiloxane units. The average number of silicon-bonded hydrogen atoms per copolymer molecule is 5 or greater and the molar ratio of repeating units containing silicon-bonded hydrogen atoms to the repeating units present in the copolymer is sufficient to provide a minimum concentration of silicon-bonded hydrogen atoms that is within the limits of this invention which, as previously defined, is from 0.35 to 0.7%, based on the weight of the foamable composition, the minimum concentration being dependent upon the initial viscosity of the foamable composition. When $R^1$ and $R^2$ of the foregoing formulae are methyl, a molar ratio of methylhydrogensiloxane to dimethylsiloxane units of 1:1 is equivalent to a silicon-bonded hydrogen content of 0.75%, based on copolymer weight. Similarly, a molar ratio of 1:3 is equivalent to a silicon-bonded hydrogen content of 0.35%. Most preferably the copolymers of this invention contain from 33 to 200 methylhydrogensiloxane units for every 100 dimethylsiloxane units.

All of the aforementioned copolymers are preferably employed in combination with a dimethylvinylsiloxy- or dimethylhydroxysiloxy terminated polydimethylsiloxane.

It has been found that useful foams are obtained when the concentration of organopolysiloxane composition on the surface of the water is at least 0.3 g. per square centimeter of water surface being treated. Preferably this amount is from 0.35 to 0.8 g. per square centimeter, depending upon the desired thickness of the final cured foam. For solar ponds, the thickness of the final foam is preferably from 0.5 to 1.0 inch (1.3–2.5 cm.).

The viscosity of the organopolysiloxane compositions employed to generate foams in accordance with the method of this invention is not critical with respect to the ability of the polysiloxane composition to form a cured foam, however, practical considerations such as the desired curing rate of the foam and the area to be covered prior to gelation of the composition often make it desirable to employ compositions having viscosities in the range of from 0.004 to 50 Pa·s at 25° C., preferably from 1 to 25 Pa·s.

The gelation time, defined as the time interval during which the polysiloxane composition will remain sufficiently fluid to continue spreading over the surface of a body of water, is a function of several parameters including the initial viscosity of the formulation, water temperature, catalyst type and concentration, and the type and concentration of the inhibitor that is employed with non-chelated platinum catalysts in accordance with the present method. Once the concept of the present invention is known, namely the ability of certain organohydrogenpolysiloxanes to form a useful cured foam when deposited on a body of water, the various combinations of the aforementioned parameters that will produce the optimum reaction rate under a given set of conditions can readily be determined by routine experimentation.

Experimental data indicate that to ensure obtaining a useful foam in accordance with the method of this invention, when the viscosity of the foamable composition is less than about 0.15 Pa·s at 25° C., any component of the composition that exhibits a viscosity of less than 0.05 Pa·s and is present at a concentration greater than 5% by weight of the composition should contain at least three silicon-bonded species per molecule that are selected from the group consisting of hydrogen atoms and groups such as vinyl and hydroxyl that are known to react with silicon-bonded hydrogen atoms in the presence of the catalysts of this invention. It has been found that copolymers exhibiting a viscosity lower than about 0.05 Pa·s that are prepared by co-reacting one or more linear or cyclic siloxanes containing more than 5 silicon-bonded hydrogen atoms per molecule with one or more siloxanes containing no silicon-bonded hydrogen atoms often contain a substantial number of molecules having fewer than three silicon-bonded hydrogen atoms or groups that react with silicon-bonded hydrogens under the conditions of the present method. These copolymers will not yield acceptable foams, even though the average number of silicon-bonded hydrogen atoms per molecule may be 5 or greater.

To ensure obtaining useful foams from low viscosity compositions (0.05-0.1 Pa·s at 25° C.) containing copolymers with close to the minimum average number (5) of silicon-bonded hydrogen atoms per molecule, it is desirable to employ as one of the starting materials for preparing the copolymer a diorganohalosilane such as dimethylchlorosilane that contains a silicon-bonded hydrogen atom. By using such a starting material, at least a major portion of the acyclic polymer molecules present in the final formulation will contain silicon-bonded hydrogen atoms at the two terminal positions.

THE FOAMING AND CURING CATALYST

One class of catalysts for preparing orgnopolysiloxane foams by the reaction of silicon-bonded hydrogen atoms with water in accordance with the method of this invention includes complexes of rhodium halides with organic sulfides or with triorganophosphines. Preferably the rhodium halide is the chloride and the hydrocarbyl groups of the complexed sulfide or phosphine are alkyl containing from 1 to about 4 carbon atoms. Complexes of rhodium chloride with triphenyl phosphines are also useful catalysts. The complexes may also contain carbonyl groups and/or one or more silicon-substituted hydrocarbon groups such as —CH$_2$Si(CH$_3$)$_3$.

Complexes of rhodium halides with sulfides or phosphines have been shown to catalyze the reaction of silicon-bonded hydrogen atoms with silanols, as, for example, in U.S. Pat. No. 4,026,835 issued on May 31, 1977 to C. L. Lee and G. W. Ronk, and 4,123,604, issued on Oct. 31, 1978 to R. W. Sanford. Both of these patents are hereby incorporated in their entirety by reference as teachings of complexed rhodium halides that are suitable catalysts for preparing organo polysiloxane foams in accordance with the present method. The patent to Lee and Ronk employs catalyzed compositions having a "pot life" or working time of at least eight hours at ambient temperature. Temperatures above 90° C. are required to achieve foam formation. By comparison, following the method of this invention, foams are obtained using the same catalysts in as short a time as 15 minutes at the temperature of the water on which the foamable composition is deposited.

The concentration of rhodium catalyst in the foamable composition is at least 0.01% based on the weight of organohydrogenpolysiloxane. Depending upon the specific catalyst selected, the concentration of silicon-bonded hydrogen atoms in the composition, the desired reaction rate and desired gelation time, the optimum concentration of rhodium complex is anywhere from this minimum value up to a maximum of about 0.5% based on the weight of organohydrogenpolysiloxane. Higher concentrations will not substantially increase the reactivity of the composition and are economically undesirable. The time required for compositions containing rhodium catalysts to begin entrapping significant amounts of hydrogen varies from 15 minutes to several hours following combining of the catalyst and polysiloxane and depositing of the composition on the surface of the water.

Representative members of the class of preferred rhodium catalysts include
RhCl$_3${S(CH$_2$CH$_3$)[CH$_2$Si(CH$_3$)$_3$]}$_3$,
RhCl$_3${S(CH$_2$CH$_2$CH$_3$)[CH$_2$Si(CH$_3$)$_3$]}$_3$,
RhCl$_3$[(CH$_3$CH$_2$)$_2$S]$_3$,
Rh$_2$Cl$_6${P(CH$_3$)[CH$_2$Si(CH$_3$)$_3$]$_2$)}$_3$,
Rh$_2$Cl$_6${P(CH$_3$)[CH$_2$Si(CH$_3$)$_3$]$_2$}$_4$',
RhCl$_3${P(C$_6$H$_5$)$_2$[CH$_2$Si(CH$_3$)$_3$]}$_3$,
RhCl(CO){P(CH$_3$)[CH$_2$Si(CH$_3$)$_3$]$_2$}$_2$ and
RhCl(CO)[P(C$_6$H$_5$)$_3$]$_2$.

A particularly preferred catalyst is RhCl$_3$[(CH$_3$CH$_2$CH$_2$CH$_2$)$_2$S]$_3$.

Rhodium complexes containing diorganosulfide ligands are prepared according to the disclosure in the Journal of the Chemical Society, (A), (1971), 899. The preparation of complexes having silicon-containing sulfide ligands is described in the Journal of Organic Chemistry, 1952, 17, 1393. The phosphine complex of the formula

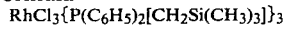

can be prepared by reacting three or four moles of

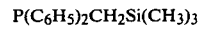

with
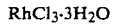

in an alcohol solvent at a temperature of from 20° C. to the boiling point. The phosphorus compounds are known from United Kingdom Patent Specification No. 1,179,242. The rhodium complex of the formula

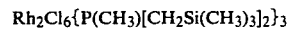

can be prepared by reacting 1.55 to 2 moles of

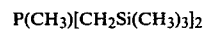

with one mole of

RhCl$_3$·3H$_2$O in an alcohol at reflux temperature. The rhodium complex of the formula Rh$_2$Cl$_6${P(CH$_3$)[CH$_2$Si(CH$_3$)$_3$]$_2$}$_4$ can be prepared by reacting at least 2.1 but less than 3 moles of P(CH$_3$){CH$_2$Si(CH$_3$)$_3$}$_2$ with one mole of RhCl$_3$·3H$_2$O in an alcohol at reflux temperature. The rhodium complexes of the formulae RhCl(CO){P(CH$_3$)[CH$_2$Si(CH$_3$)$_3$]$_2$}$_2$ and RhCl(CO)[P(C$_6$H$_5$)$_3$]$_2$ can be prepared by treating RhCl$_3$·3H$_2$O with carbon monoxide in ethanol for several hours and then adding either P(CH$_3$)[CH$_3$Si(CH$_3$)$_3$]$_2$ or

P(C$_6$H$_5$)$_3$.

A second class of catalyst compositions that can be used to generate polysiloxane foams in accordance with the method of this invention includes the combinations of platinum-containing catalysts and inhibitors disclosed in U.S. Pat. No. 3,445,420, issued on May 20, 1969 to G. J. Kookootsedes and E. P. Plueddemann. This patent is hereby incorporated into this specification by reference as a teaching of platinum catalysts and inhibitors suitable for use in the present method.

The platinum catalyst can be any of those known for the reaction of organopolysiloxanes containing silicon-bonded hydrogen atoms with organopolysiloxanes containing at least one terminally unsaturated olefinic hydrocarbon group, such as vinyl, per molecule and no acetylenic (—C≡C—) unsaturation. These catalysts include platinum metal, which is conventionally employed in combination with solid carriers such as silica gel and powdered charcoal, and platinum compounds such as the chloride and chloroplatinic acid. Many of the platinum catalysts suitable for use in the method of this invention are described in U.S. Pat. No. 3,697,473, which issued on Oct. 10, 1972 and is hereby incorporated by reference as a teaching of suitable platinum catalysts. A class of platinum catalysts preferred for use in the present method is described in U.S. Pat. No. 3,419,593, which issued on Dec. 31, 1968 and is hereby incorporated by reference to show the preparation of this prepared class of platinum catalysts. A particularly preferred class of catalysts disclosed in this patent includes reaction products of chloroplatinic acid with polydimethylsiloxanes having at least two dimethylvinylsiloxy units per molecule.

In accordance with the present method, the minimum effective concentration of a platinum-containing catalyst is equivalent to 0.1 part by weight of platinum per one million parts by weight of organohydrogenpolysiloxane. A preferred concentration range for the platinum catalysts is equivalent to from 1 to 200 parts of platinum per million of organohydrogenpolysiloxane.

With one exception of chelated platinum compounds such as platinum II diacetylacetonate, platinum catalysts are usually so effective for the reaction of organohydrogensiloxanes with water in accordance with the present method that in the absence of an inhibitor even trace amounts of these catalysts product a reaction rate that is either too rapid to form a useful foam or will not allow the polysiloxane composition to distribute itself uniformly over the desired surface area before the curing reaction progresses to the extent that the composition is no longer self leveling. The platinum catalysts should therefore be used in combination with an inhibitor that will retard the activity of the platinum catalyst sufficiently to permit the foamable composition to uniformly distribute itself over the desired surface area. Once this has been achieved, the inhibitor should permit a rate of reaction that is sufficiently rapid to yield a cured foam within a relatively short time, which can range from about 30 minutes to several hours.

A class of platinum catalyst inhibitors suitable for use in the present method are the acetylenic compounds disclosed in the aforementioned U.S. Pat. No. 3,445,420. Suitable inhibitors of this type are organic compounds having (1) a boiling point of at least 25° C. under atmospheric pressure, (2) at least one —C≡C— group and (3) no nitrogen, phosphorus, —SH, =O or carboxyl groups located immediately adjacent to the —C≡C— group. The molar ratio of inhibitor to platinum is at least 2.

A preferred class of inhibitors for use in the present method includes secondary and tertiary acetylenic alcohols containing from four to about ten carbon atoms. Specific examples of preferred inhibitors include 2-ethynylisopropanol, 2-ethynylbutane-2-ol, 1-hexyne-3-ol, 2,5-dimethyl-3-hexyne-2,5-diol, 3,6-dimethyl-4-octyne-3,6-diol, 2,4,7,9-tetramethyl-5-decyne-4,7-diol and 3,5-dimethyl-1-hexyne-3-ol. A particularly preferred inhibitor is 2-methyl-3-butyn-2-ol, this preference being based on the cost and availability of the compound.

The relative amount of a given inhibitor that will yield the optimum combination of a sufficiently long time period prior to gelation and the desired coordination between the curing and hydrogen evolution reactions can readily be determined with only routine experimentation.

In most instances at least two moles of inhibitor per mole of platinum present in the catalyst will be required to retard the reaction of the silicon-bonded hydrogen atoms sufficiently to obtain a useful foam.

One class of platinum compounds suitable for use in the method of this invention without an inhibitor includes the chelated platinum compounds, such as platinum II diacetylacetonate disclosed in U.S. Pat. No. 3,723,497 which issued on Mar. 27, 1973 to R. H. Baney and is hereby incorporated by reference.

The compositions employed in the method of this invention optionally contain one or more reinforcing fillers to increase the strength of the final foam. Typical fillers of this type that are suitable for use in the present invention include fumed silica and silica aerogels. Small amounts of extending fillers such as calcium carbonate and alumina may also be included. If the foam will be generated on a pond that is intended to be heated by solar radiation, amounts of additives which render the final foam opaque should be kept to a minimum so as not to adversely affect the light transmittance of the final foam. Opaque foams can be used if the source used to heat the water is not solar radiation. For example, the water can be used to provide cooling for a nuclear reactor or the liquid employed to cool the reactor can be circulated through a contained body of water that is protected against evaporation and heat loss by a foam generated using the method of this invention.

Other optional ingredients that can be present in the foamable compositions of this invention include solvents for the polysiloxane components, plasticizers and stabilizers.

Many of the liquid organohydrogenpolysiloxanes and other optional polysiloxanes that yield useful foams in accordance with the method of this invention exhibit specific gravities less than 1.0 at 25° C. and will therefore float on top of a body of water when poured, sprayed or otherwise deposited on the water and remain on the surface during the polymerization reaction. Under certain conditions, particularly if fillers are present, the specific gravity of the initial foamable composition can exceed 1.0 at 25° C. Such compositions would tend to sink toward the bottom of a body of fresh water. These foamable compositions are suitable for preparing foams in accordance with the present method, since the hydrogen generated as the composition units with the water will eventually offset the tendency of the composition to sink, particularly once the composition has become sufficiently viscous to entrap the hydrogen bubbles. At some point during the polymerization reaction the composition will become sufficiently buoyant that it will rise to the surface of the water and remain there as a cured foam.

Compositions containing an organohydrogenpolysiloxane and one of the aforementioned foaming and curing catalysts usually cannot be stored for prolonged periods before being used, since it is difficult to remove the trace amounts of water that are usually present in such compositions. The water will react with the polysiloxane composition, thereby reducing the amount of organohydrogenpolysiloxane available for foam formation. In addition, the hydrogen generated as a by-product during storage of the composition can present a serious safety hazard, particularly if the gas is confined in a sealed container, as would conventionally be done to avoid contact with atmospheric moisture.

When generating foams in accordance with the present method, it is therefore preferable to store the organohydrogenpolysiloxane and the catalyst as separate components which are combined just prior to the time that the foamable composition is to be applied onto the surface of a body of water. The catalyzed composition can be deposited onto the water using any of the methods and equipment conventionally employed to apply water-immiscible liquid compositions, such as those containing liquid hydrocarbons, onto water or agricultural crops. If the body of water is relatively small, foamable compositions of this invention can be poured as a single portion onto the surface of the water. The initial compositions are usually sufficiently low in viscosity and surface tension to be self-leveling and will continue to spread over the surface of the water until they achieve a degree of cross-linking sufficient to prevent any further change in the dimensions of the polymerizing mixture. Larger surface areas can be treated by pouring or spraying foamable compositions from a moving vehicle, such as a boat or low-flying aircraft. Spraying and mixing equipment conventionally used for large scale applications of liquid compositions are suitable for applying the foamable compositions of this invention.

To optimize the insulative properties of the foam the average cell size should be from 0.3 to 1.5 centimeters. The cell size will be determined by the relationship between the rate of curing of the organohydrogensiloxane and the rate of hydrogen evolution. From the ranges suitable for use in the method of this invention, with a minimum of experimentation it is possible to determine the concentration of catalyst, silicon-bonded hydrogen atoms, and viscosity of the initial formulation that will yield a foam having an average cell size within this preferred range.

The following examples illustrate various embodiments of this invention and should not be construed as limiting the scope thereof as defined in the accompanying claims. All parts and percentages are by weight unless otherwise indicated.

EXAMPLE 1

This example demonstrates the relationship between the concentration of silicon-bonded hydrogen atoms in the initial formulation and the properties of the final foam. The formulations were prepared by combining the organohydrogensiloxane, other additional siloxanes as specified, and a rhodium catalyst and pouring the resultant mixture onto a one inch (2.5 cm)-deep layer of water in a shallow aluminum dish, which was then placed in direct sunlight. Generation of hydrogen gas was observed shortly after pouring the formulation onto the water. Expansion of the polysiloxane layer into a foam occurred gradually over a period of from ½ to 2 hours. The concentration of the organohydrogenpolysiloxane layer was equivalent to 0.40–0.45 g./cm² of water surface.

The rhodium catalyst employed in all instances was a 3% by weight solution of $Rh[(n-C_4H_9)_2S]_3Cl_3$ in toluene. The organopolysiloxanes are identified in the accompanying Table 1 as follows:

Polysiloxane A—a liquid trimethylsiloxy terminated polymethylhydrogensiloxane exhibiting a viscosity of 0.02 to 0.04 Pa·s at 25° C., an average of 40 silicon-bonded hydrogen atoms per molecule and a silicon-bonded hydrogen content (by analysis) of 1.56%.

Polysiloxane B—a dimethylhydrogensiloxy terminated copolymer containing 0.71 weight % of silicon-bonded hydrogen atoms. The repeating units are dimethylsiloxy and methylhydrogensiloxy in an average molar ratio of 3:5, respectively and the viscosity of the copolymer is 0.004–0.006 Pa·s at 25° C. The average number of silicon-bonded hydrogen atoms per molecule is 5.

Polysiloxane C—a trimethylsiloxy terminated copolymer containing 0.75% by weight of silicon-bonded hydrogen atoms. The repeating units are dimethylsiloxy and methylhydrogensiloxy in an average molar ratio of 5:3. The average number of silicon-bonded hydrogen atoms per molecule is 5 and the viscosity of the polysiloxane is 0.004–0.006 Pa·s at 25° C.

Polysiloxane D—a dimethylhydrogensiloxy terminated polydimethylsiloxane containing 88% by weight of dimethylsiloxy groups. The average number of silicon-bonded hydrogen atoms per molecule is 2, the concentration of silicon-bonded hydrogen atoms is 0.194% and the viscosity of the polysiloxane is 0.010–0.015 Pa·s at 25° C.

Polysiloxane E—a dimethylhydrogensiloxy terminated copolymer containing dimethylsiloxy and methylhydrogensiloxy groups in a molar ratio of 19:1 and a silicon-bonded hydrogen content of 0.07%. The average number of silicon-bonded hydrogen atoms per molecule is 27 and the viscosity is in excess of 5 Pa·s at 25° C.

The types and amounts of reagents employed to prepare the foams, the concentration of silicon-bonded hydrogen atoms (Si-H) in the formulation, the gelation time and a qualitative evaluation of the final foam together with the average cell diameter, when determined, are recorded in the following Table 1. The gelation time is the time interval between pouring of the composition onto the water and polymerization of the composition to an extent that it could no longer continue to spread over the surface of the water.

TABLE 1

| Formulation Number | Polysiloxane (Parts) | Si—H (% by Wt.) | Catalyst Conc. (Parts) | Gelation Time (Hours) | Cell Diameter (mm) | Foam Quality |
|---|---|---|---|---|---|---|
| 1 | A(23.4) | 1.56 | 0.3 | 1 | 1–10 | Cured, brittle |
| 2 | A(22.2), C(11.1) | 1.29 | 0.73 | 1 | — | Cured, brittle |
| 3 | A(11.1) C(22.2) | 1.02 | 0.73 | 1 | — | Cured, brittle |
| 4 | A(16.65) D(16.65) | 0.88 | 0.73 | 1–2 | 3–10 | Cured, brittle |
| 5 | B(33.3) | 0.71 | 0.73 | 24 | 2–6 | Cured, flexible |
| 6 | A(4.0) E(14.0) | 0.41 | 0.37 | 1 | 3–7 | Cured, flexible |
| 7 (control) | C(33.3) | 0.75 | 0.73 | — | — | Incompletely cured |
| 8 (control) | B(27.88), D(5.42) | 0.64 | 0.73 | — | — | Not cured |
| 9 (control) | B(15.37) D(17.92) | 0.44 | 0.73 | — | — | Not cured |

Formulations 1 through 6 yielded cured foams that would function as insulating materials for solar ponds in accordance with the present method. The foams prepared from compositions containing more than about 1% by weight of silicon-bonded hydrogen atoms (SiH) were somewhat brittle, but could be used in locations where they would not be subjected to considerable wave action or weathering.

The best quality foams were obtained using 33.3 parts of polysiloxane B (0.71% SiH) or a mixture of 4.0 parts of polysiloxane A (1.7% SiH) and 14.0 parts of polysiloxane E (0.07% SiH), equivalent to a total SiH content of 0.41%.

Polysiloxane C employed in control formulation 7 is a relatively low viscosity (less than 0.15 Pa·s at 25° C.) trimethylsiloxy terminated copolymer containing methylhydrogensiloxy and dimethylsiloxy units. Even though the overall SiH content is barely within the lower limit (0.7%) for the viscosity range and the copolymer contains an average of 5 silicon-bonded hydrogen atoms per molecule, it is believed that the distribution of repeating units containing silicon-bonded hydrogen atoms is sufficiently nonuniform among the copolymer molecules that a significant portion of the molecules contain fewer than three silicon-bonded hydrogen atoms. When a composition containing this type of polysiloxane reacts with water in accordance with the present method, the presence of molecules containing fewer than 3 silicon-bonded hydrogen atoms or other silicon-bonded groups that are reactive with water or silicon-bonded hydrogen atoms prevents formation of an acceptable foam.

The combinations of polysiloxanes B and D employed in control formulations 8 and 9 exhibited a viscosity of less than 0.01 Pa·s at 25° C. and contained less than 0.7% by weight of silicon-bonded hydrogen atoms, the minimum value required to form acceptable foams in accordance with the method of this invention using formulations having viscosities below 0.05 Pa·s. As expected, the foams prepared using these formulations did not cure.

EXAMPLE 2

This example employs two high molecular weight polydimethylsiloxanes that are used individually in combination with a relatively low molecular weight polymethylhydrogensiloxane. The polymethylhydrogensiloxane is identified as polysiloxane A in the preceding Example 1 and was present at a concentration of 57.6 parts per hundred parts of the polydimethylsiloxane. One of the two polydimethylsiloxanes contained dimethylhydroxysiloxy end groups and exhibited a viscosity of from 40 to 55 Pa·s at 25° C. The second polydimethylsiloxane contained dimethylvinylsiloxy end groups and exhibited a viscosity of 40 to 65 Pa·s at 25° C. Each of the two formulations contained the rhodium catalyst composition described in Example 1 at a concentration of 5.7 to 5.9%, based on the weight of the polymethylhydrogensiloxane, which is equivalent to 0.17% by weight of catalyst.

Each of the aforementioned formulations produced an acceptable cured form under the reaction conditions described in the preceding Example 1. The diameter of the cells in the final cured foams ranged from 2 to 10 millimeters.

EXAMPLE 3

This example demonstrates the ability of a foam prepared using the method of this invention to reduce heat loss from a contained body of water exposed to solar radiation. The outer walls of two cylindrical metal containers measuring 23.5 inches (59.78 cm.) in diameter and 17.5 inches (44.5 cm) in height were wrapped with fiberglass insulation having a thickness of 3 inches (7.6 cm.) and an outer layer of plastic to keep the insulation dry. The insulation covered all of the outer surface of each container. The two containers were placed adjacent to one another in an outdoor area that was exposed to the direct rays of the sun. Each container was then filled with water to a level of about two inches (5 cm.)

below the top of the container. A thermocouple was immersed in each body of water and a third thermocouple was suspended in the air between the two containers. The three thermocouples were connected to a multi-channel recorder.

On September 29 a polyorganosiloxane foam was generated on the surface of the water in one of the containers by pouring onto the surface of the water a composition containing 593.8 g. of a dimethylhydroxysiloxy terminated polydimethylsiloxane having a viscosity of 40 to 50 Pa·s at 25° C. and containing an average of 40 dimethylsiloxy units per molecule, 341.9 g. of the polymethylhydrogensiloxane referred to as polysiloxane A in the preceding Example 1 and 19.6 g of the rhodium catalyst composition described in the preceding Example 1 (equivalent to 0.17% catalyst, based on the weight of polymethylhydrogensiloxane). The generation of bubbles was observed soon after the composition was placed on the water. Within fifteen minutes after being applied, the viscosity of the polyorganosiloxane layer had increased sufficiently to entrap the bubbles. Gelation occurred about 30 minutes later. Within two hours after being applied the polysiloxane layer had cured to yield a foam having 2 to 3 layers of cells measuring from 3 to 10 mm in diameter. The surface of the water in the second container was left uncovered as a control. The water temperature was about 21° C. during formation and curing of the foam and the sun was present.

The water temperatures in the two containers and the temperature of the surrounding air were continuously recorded from October 7 to October 11. At this time there was an inadvertant interruption in the supplying of power to the recorder. Power was restored on October 13 and the experiment was continued until October 25. The temperature variations exhibited by the water in the two containers and the ambient air are plotted as a function of time in the drawing (FIG. 1) accompanying this specification, together with an indication of the degree of cloudiness on each of the days that the test was in progress. The water temperature in the uncovered control container is represented by a broken line consisting of dashes, the temperature of the covered water is represented by a broken line consisting of alternating dashes and dots and the temperature of the ambient air adjacent to the two containers is represented by a line of dots.

The white and diagonally shaded sections of the horizontal bar graph in FIG. 1 represent daylight hours and the cross-hatched areas represent the hours between sunset and sunrise. The shading of the daytime portions indicates the amount and duration of the cloud cover on any given day. For example, if the sun was obscured by clouds for approximately half of the time throughout the entire day, the lower half of the white area for that particular day is shaded (e.g. October 10). If clouds obscured the sun for a part of the day, the area representing that part of the day is shaded (e.g. October 7).

During the period from October 7 to October 25, the temperature of the ambient air in the area of the containers varied continuously from a minimum of 0° C. to a maximum of 20° C. During this same period the temperature of the water covered by the polyorganosiloxane foam varied from a minimum of about 8° C. to a maximum of about 14° C., a considerably smaller range than recorded for the temperature of the uncovered water (3° to 13° C.). The temperature of the water protected by the foam was at least equal to, and in most instances was from 1° to 7° C. above the temperature of the uncovered water in the control container.

The data from the foregoing experiment demonstrate the ability of foams prepared in accordance with the method of this invention to effectively insulate contained bodies of water against heat loss. This property is especially desirable for those applications wherein the heat imparted to the water by the sun or other heat source is converted to other useful forms of energy, particularly electrical energy, by suitable means, such as turbines driven by vapors of a suitable relatively low boiling liquid which is vaporized by the heated water.

That which is claimed is:

1. A method for reducing evaporation and heat loss from a contained body of water by (1) depositing on the surface thereof a substantially coherent layer containing an amount equal to at least 0.3 gram per square centimeter of water surface of a foamable and curable liquid composition comprising (a) a liquid organohydrogenpolysiloxane containing an average of at least 5 silicon-bonded hydrogen atoms per molecule and no more than one hydrogen atom bonded to any silicon atom, wherein the organic groups bonded to silicon are selected from the group consisting of alkyl containing from 1 to 6 carbon atoms, fluoroalkyl containing from 1 to 3 carbon atoms, cycloalkyl and phenyl, and (b) an amount of a catalyst sufficient to cause the reaction of said organohydrogenpolysiloxane with water to proceed at a rate that will yield a cured foam at the temperature of said body of water and (2) thereafter allowing said composition to form a cured foam on the surface of said body of water, wherein the minimum concentration of silicon-bonded hydrogen atoms in said composition is 0.7% based on the weight of said composition when the viscosity of said composition is 0.05 Pa·s or less, as measured at 25° C., and decreases from 0.7% to 0.35% as the viscosity of said composition increases from 0.05 to 5 Pa·s, and is 0.35% when the viscosity equals or exceeds 5 Pa·s, with the proviso that when the viscosity of said composition is less than about 0.15 Pa·s any polysiloxane component of said composition that constitutes more than 5% by weight of the composition and exhibits a viscosity lower than 0.05 Pa·s contains at least three silicon-bonded species per molecule, said species being selected from the group consisting of hydrogen, hydroxyl and vinyl.

2. A method according to claim 1 where said foamable and curable composition contains a reinforcing or extending filler.

3. A method according to claim 1 where the liquid organohydrogenpolysiloxane is a cyclic or acyclic homopolymer having repeating units of the formula

or an acyclic copolymer having repeating units of the formulae

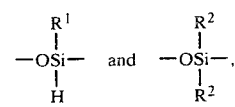

where $R^1$ and each $R^2$ are individually selected from the group consisting of alkyl containing from 1 to 6 carbon atoms, fluoroalkyl containing from 1 to 3 carbon atoms, cycloalkyl and phenyl, the viscosity of said liquid composition is from 0.004 to 50 Pa·s, measured at 25° C., and the density of said composition is less than 1.0 g. per cubic centimeter.

4. A contained body of water containing on the surface thereof a cured organopolysiloxane foam prepared in accordance with the method of claim 1 or 3.

5. A method according to claim 1 or claim 3 where the organohydrogenpolysiloxane contains an average of from 5 to 40 silicon-bonded hydrogen atoms per molecule and said catalyst is a rhodium halide complex of an organic sulfide or a triorganophosphine wherein the organic groups of said sulfide are alkyl containing from 1 to 4 carbon atoms or $-CH_2Si(CH_3)_3$ and the organic groups of the triorganophosphine are alkyl containing from 1 to 4 carbon atoms, phenyl or $-CH_2Si(CH_3)_3$ and the concentration of said catalyst is at least 0.01%, based on the weight of said organohydrogenpolysiloxane.

6. A method according to claim 5 where said organohydrogenpolysiloxane is acyclic and contains a member selected from the group consisting of silicon-bonded hydrogen atoms and silicon-bonded methyl groups in the terminating units of the polysiloxane, the concentration of said rhodium halide complex is from 0.01 to 0.5%, based on the weight of said polysiloxane, said complex exhibits a formula selected from the group consisting of

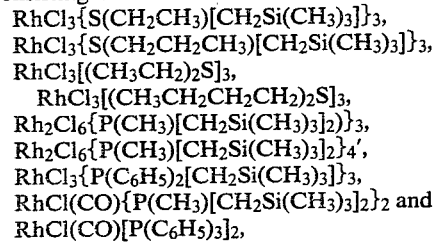

$RhCl_3\{S(CH_2CH_3)[CH_2Si(CH_3)_3]\}_3$,
$RhCl_3\{S(CH_2CH_2CH_3)[CH_2Si(CH_3)_3]\}_3$,
$RhCl_3[(CH_3CH_2)_2S]_3$,
$RhCl_3[(CH_3CH_2CH_2CH_2)_2S]_3$,
$Rh_2Cl_6\{P(CH_3)[CH_2Si(CH_3)_3]_2\}_3$,
$Rh_2Cl_6\{P(CH_3)[CH_2Si(CH_3)_3]_2\}_4$,
$RhCl_3\{P(C_6H_5)_2[CH_2Si(CH_3)_3]\}_3$,
$RhCl(CO)\{P(CH_3)[CH_2Si(CH_3)_3]_2\}_2$ and
$RhCl(CO)[P(C_6H_5)_3]_2$, and the concentration of silicon-bonded hydrogen atoms is from 0.35 to 0.7% based on the weight of said composition.

7. A method according to claim 6 where said organohydrogenpolysiloxane is a copolymer, the organic groups bonded to silicon are methyl, and the viscosity of said liquid composition is from 1 to 25 Pa·s at 25° C.

8. A method according to claim 7 where the copolymer molecule contains from 33 to 200 methylhydrogensiloxane units for every 100 dimethylsiloxane units, the rhodium halide complex is

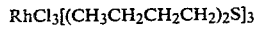

$RhCl_3[(CH_3CH_2CH_2CH_2)_2S]_3$ and the amount of said liquid composition deposited on the surface of the body of water is equivalent to from 0.35 to 0.8 gram per square centimeter of water surface.

9. A method according to claim 6 where said organohydrogenpolysiloxane is a homopolymer, $R^1$ is methyl and the viscosity of said liquid composition is from 1 to 25 Pa·s at 25° C.

10. A method according to claim 9 where the rhodium halide complex is

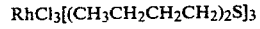

$RhCl_3[(CH_3CH_2CH_2CH_2)_2S]_3$ and the amount of liquid composition deposited on the surface of the water is equivalent to from 0.35 to 0.8 gram per square centimeter of water surface.

11. A method according to claim 6 where said organohydrogenpolysiloxane is present in combination with a hydroxyl- or vinyl-terminated polydimethylsiloxane.

12. A method according to claim 5 where said organohydrogenpolysiloxane is a copolymer, the organic groups bonded to silicon are methyl, and the viscosity of said liquid composition is from 1 to 25 Pa·s at 25° C.

13. A method according to claim 12 where the copolymer molecule contains from 33 to 200 methylhydrogensiloxane units for every 100 dimethylsiloxane units, the rhodium halide complex is

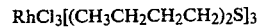

$RhCl_3[(CH_3CH_2CH_2CH_2)_2S]_3$ and the amount of said liquid composition deposited on the surface of the body of water is equivalent to from 0.35 to 0.8 gram per square centimeter of water surface.

14. A method according to claim 11 where said organohydrogenpolysiloxane is a homopolymer, $R^1$ is methyl and the viscosity of said liquid composition is from 1 to 25 Pa·s at 25° C.

15. A method according to claim 14 where the rhodium halide complex is

$RhCl_3[(CH_3CH_2CH_2CH_2)_2S]_3$ and the amount of liquid composition deposited on the surface of the water is equivalent to from 0.35 to 0.8 gram per square centimeter of water surface.

16. A method according to claim 1 or claim 3 where the organohydrogenpolysiloxane contains an average of from 5 to 40 silicon-bonded hydrogen atoms per molecule and said catalyst consists essentially of (a) a catalytically effective amount of a platinum-containing catalyst of the type employed for the reaction of silicon-bonded hydrogen atoms with organopolysiloxanes containing at least one terminally unsaturated olefinic hydrocarbon group and (b) an amount of inhibitor which will retard the activity of said platinum-containing catalyst sufficiently to allow the foamable composition to cover the desired surface area on said body of water prior to the formation of a cured foam.

17. A method according to claim 16 where said organohydrogenpolysiloxane is acyclic and contains a silicon-bonded hydrogen atom, or silicon-bonded methyl groups in the terminating units of the polysiloxane, the concentration of said platinum-containing catalyst is equivalent to at least 0.1 part by weight of platinum per million parts by weight of said organohydrogenpolysiloxane, said platinum-containing catalyst is a reaction product of chloroplatinic acid with a polydimethylsiloxane having at least two dimethylvinylsiloxy groups per molecule, the inhibitor is selected from the group consisting of organic compounds having (a) a boiling point under atmospheric pressure of at least 25° C., (b) at least one $-C\equiv C-$ group and (c) no nitrogen, phosphorus, $-SH$, $=O$ or carboxyl groups located immediately adjacent to said $-C\equiv C-$ group and the molar ratio of inhibitor to said platinum-containing catalyst is at least 2.

18. A method according to claim 17 where said organohydrogenpolysiloxane is a copolymer, the organic groups bonded to silicon are methyl, the viscosity of said liquid composition is from 1 to 25 Pa·s at 25° C., said inhibitor is selected from the group consisting of secondary and tertiary acetylenic alcohols containing from 4 to 10 carbon atoms and the concentration of silicon-bonded hydrogen atoms is from 0.35 to 0.7%, based on the weight of said liquid composition.

19. A method according to claim 18 where the copolymer molecule contains from 33 to 200 methylhydrogensiloxane units for every 100 dimethylsiloxane units, the concentration of the platinum-containing catalyst is equivalent to from 1 to 200 parts by weight of platinum per million parts of organohydrogenpolysiloxane, said inhibitor is 2-methyl-3-butyn-2-ol and the concentration of said liquid composition is from 0.35 to 0.8 gram per square centimeter of water surface.

20. A method according to claim 17 where said organohydrogenpolysiloxane is a homopolymer, the organic groups bonded to silicon are methyl, the viscosity of said liquid composition is from 1 to 25 Pa·s at 25° C., said inhibitor is selected from the group consisting of secondary and tertiary acetylenic alcohols containing from 4 to 10 carbon atoms and the concentration of silicon-bonded hydrogen atoms is from 0.35 to 0.7%, based on the weight of said liquid composition.

21. A method according to claim 20 where the concentration of the platinum-containing catalyst is equivalent to from 1 to 200 parts by weight of platinum per million parts of organohydrogenpolysiloxane, said inhibitor is 2-methyl-3-butyn-2-ol and the concentration of said liquid composition is from 0.35 to 0.8 gram per square centimeter of water surface.

22. A method according to claim 17 where said organohydrogenpolysiloxane is present in combination with a hydroxyl- or vinyl terminated polydimethylsiloxane.

23. A method according to claim 22 where said organohydrogenpolysiloxane is a copolymer, the organic groups bonded to silicon are methyl, the viscosity of said liquid composition is from 1 to 25 Pa·s at 25° C., said inhibitor is selected from the group consisting of secondary and tertiary acetylenic alcohols containing from 4 to 10 carbon atoms and the concentration of silicon-bonded hydrogen atoms is from 0.35 to 0.7%, based on the weight of said liquid composition.

24. A method according to claim 23 where the copolymer molecule contains from 33 to 200 methylhydrogensiloxane units for every 100 dimethylsiloxane units, the concentration of the platinum-containing catalyst is equivalent to from 1 to 200 parts by weight of platinum per million parts of organohydrogenpolysiloxane, said inhibitor is 2-methyl-3-butyn-2-ol and the concentration of said liquid composition is from 0.35 to 0.8 gram per square centimeter of water surface.

25. A method according to claim 22 where said organohydrogenpolysiloxane is a homopolymer, the organic groups bonded to silicon are methyl, the viscosity of said liquid composition is from 1 to 25 Pa·s at 25° C., said inhibitor is selected from the group consisting of secondary and tertiary acetylenic alcohols containing from 4 to 10 carbon atoms and the concentration of silicon-bonded hydrogen atoms is from 0.35 to 0.7%, based on the weight of said liquid composition.

26. A method according to claim 25 where the concentration of the platinum-containing catalyst is equivalent to from 1 to 200 parts by weight of platinum per million parts of organohydrogenpolysiloxane, said inhibitor is 2-methyl-3-butyn-2-ol and the concentration of said liquid composition is from 0.35 to 0.8 gram per square centimeter of water surface.

* * * * *